(12) United States Patent
Chang

(10) Patent No.: US 12,528,285 B2
(45) Date of Patent: Jan. 20, 2026

(54) FEEDING MECHANISM AND EDGE BANDING MACHINE INCLUDING THE SAME

(71) Applicant: OAV EQUIPMENT AND TOOLS, INC., Taichung (TW)

(72) Inventor: Yen-Tsung Chang, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 105 days.

(21) Appl. No.: 18/735,817

(22) Filed: Jun. 6, 2024

(65) Prior Publication Data

US 2025/0375962 A1 Dec. 11, 2025

(51) Int. Cl.
*B32B 38/18* (2006.01)
*B32B 37/00* (2006.01)

(52) U.S. Cl.
CPC .......... *B32B 38/18* (2013.01); *B32B 37/0046* (2013.01)

(58) Field of Classification Search
CPC .............................. B32B 38/18; B32B 7/0046
See application file for complete search history.

(56) References Cited

U.S. PATENT DOCUMENTS

| 2019/0084174 A1* | 3/2019 | Wilson ................ B26D 7/0625 |
| 2024/0042675 A1* | 2/2024 | Chang ................ B29C 63/0026 |

* cited by examiner

*Primary Examiner* — Vishal I Patel
(74) *Attorney, Agent, or Firm* — MUNCY, GEISSLER, OLDS & LOWE, P.C.

(57) ABSTRACT

A feeding mechanism and an edge banding machine including the same are provided. The feeding mechanism includes a first conveying unit, a second conveying unit and a height adjustment mechanism. The first conveying unit is configured to be disposed on a base along a feeding direction. The second conveying unit is configured to clamp a workpiece with the first conveying unit to move the workpiece along the feeding direction. The second conveying unit includes a cantilever configured to be disposed on the base, and the cantilever is spaced apart from the first conveying unit and a position of the cantilever is 10 adjustable in a height direction. The height adjustment mechanism includes a locking member and a correction member configured to be abutted against the workpiece, and the correction member is connected with the cantilever and is co-movable with the cantilever in the height direction.

10 Claims, 8 Drawing Sheets

FEEDING MECHANISM AND EDGE BANDING MACHINE INCLUDING THE SAME

FIELD OF THE INVENTION

The present invention relates to a feeding mechanism and an edge banding machine including the same.

Description of the Prior Art

An edge banding machine is used to adhesive an edge band to a surface of a board so that a cut edge of the board is covered by the edge band so as to have good appearance and be smooth and not prick hands. Generally, the edge banding machine includes a conveyor, a pressing wheel set disposed above the conveyor and an edge band conveying mechanism. The board is clamped between the conveyor and the pressing wheel set clamp and can be moved, and the edge band conveying mechanism is adapted to convey the edge band to a side of the board so as to provide automatic edge-banding effect. For processing the boards with different thicknesses, a height of the pressing wheel set is adjustable by a height adjustment mechanism so as to change a distance between the pressing wheel set and the conveyor for clamping and conveying the boards with different thicknesses.

However, in long-term use, the pressing wheel set may be worn or deformed, and a side of the pressing wheel set remote from the height adjustment mechanism may sag toward the conveyor due to its weight. Therefore, the distance between the pressing wheel set and the conveyor may be smaller than a thickness of the board, which may cause difficulty in feeding the board or cause the board to be deformed and damaged due to improper force. It may also affect the edge banding operation and cause a decrease in processing yield.

The present invention is, therefore, arisen to obviate or at least mitigate the above-mentioned disadvantages.

SUMMARY OF THE INVENTION

The main object of the present invention is to provide a feeding mechanism and an edge banding machine including the same, which has good transmission stability and can accurately adjust a distance at which it clamps a workpiece so as to avoid deformation and damage of the workpiece.

To achieve the above and other objects, the present invention provides a feeding mechanism, including: a first conveying unit, a second conveying unit and a height adjustment mechanism. The first conveying unit is configured to be disposed on a base along a feeding direction. The second conveying unit is configured to clamp a workpiece with the first conveying unit to move the workpiece along the feeding direction. The second conveying unit includes a cantilever configured to be disposed on the base, and the cantilever is spaced apart from the first conveying unit and a position of the cantilever is adjustable relative to the first conveying unit in a height direction. The height adjustment mechanism includes a locking member and a correction member configured to be abutted against the workpiece. The locking member is releasably connected with the base and the cantilever, and the correction member is connected with the cantilever and is co-movable with the cantilever in the height direction.

To achieve the above and other objects, the present invention further provides an edge banding machine, configured to attached an edge band to a workpiece, including the feeding mechanism as described above, further including: the base and an edge band conveying mechanism. The edge band conveying mechanism is configured to convey the edge band to a side of the feeding mechanism.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
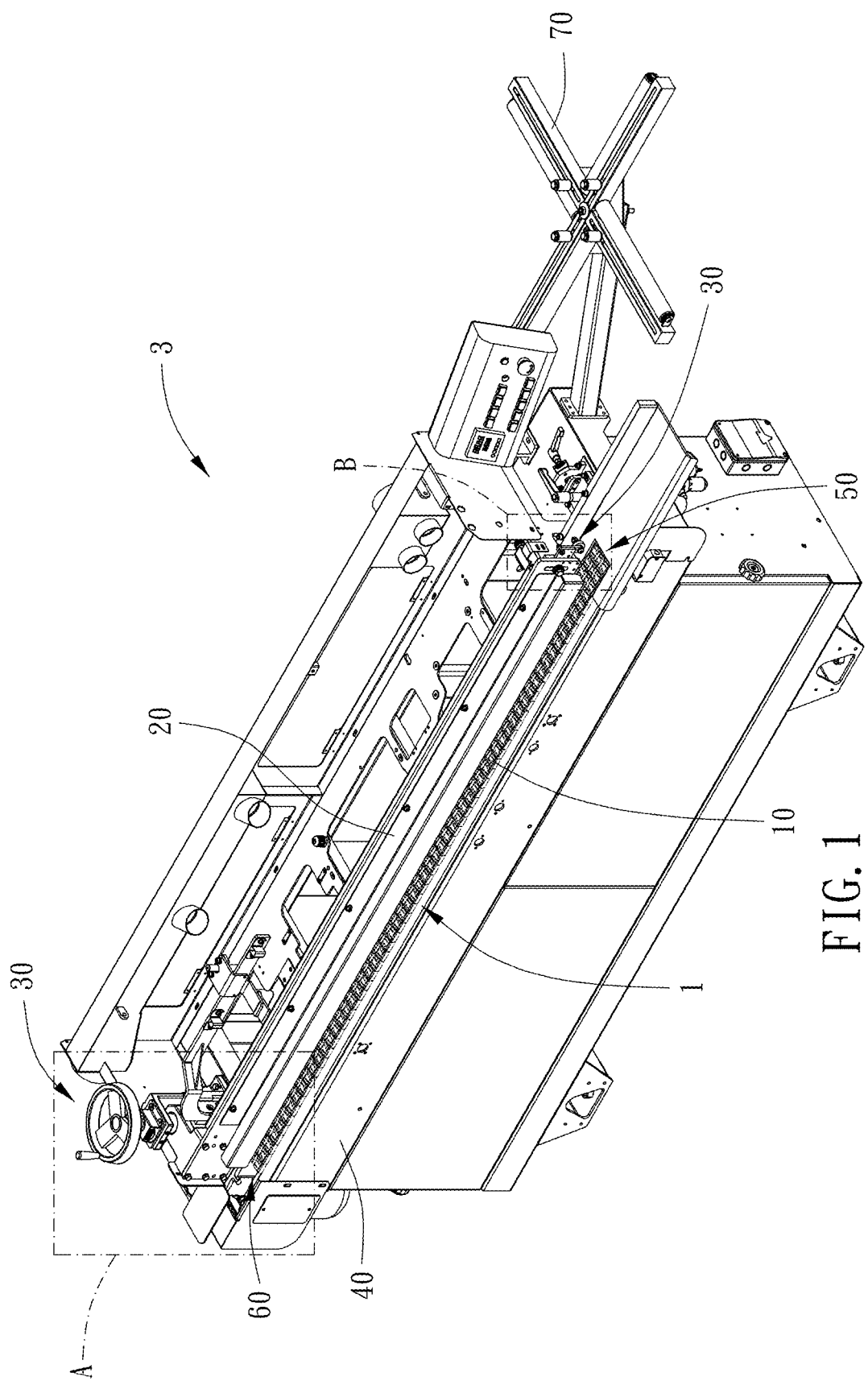
FIG. 1 is a stereogram of a preferable embodiment of the present invention.

Please refer to FIGS. 1 to 8 for a preferable embodiment of the present invention. A feeding mechanism 1 of the present invention includes a first conveying unit 10, a second conveying unit 20 and a height adjustment mechanism 30.

The first conveying unit 10 is configured to be disposed on a base 40 along a feeding direction I. The second conveying unit 20 is configured to clamp a workpiece 2 with the first conveying unit 10 to move the workpiece 2 along the feeding direction I. The second conveying unit 20 includes a cantilever 21 configured to be disposed on the base 40, and the cantilever 21 is spaced apart from the first conveying unit 10 and a position of the cantilever 21 is adjustable relative to the first conveying unit 10 in a height direction H. The height adjustment mechanism 30 includes a locking member 31 and a correction member 32 configured to be abutted against the workpiece 2. The locking member 31 is releasably connected with the base 40 and the cantilever 21, and the correction member 32 is connected with the cantilever 21 and is co-movable with the cantilever 21 in the height direction H. Therefore, by abutting the correction member 32 against the workpiece 2, a distance between the cantilever 21 and the first conveying unit 10 can be accurately adjusted so that the workpiece 2 can be clamped properly, which avoids deformation and damage of the workpiece 2 and facilitates automatic edge banding, grinding or cutting and other processing operations.

Specifically, the first conveying unit 10 includes a conveyor 11, such as a roller conveyor or a belt conveyor. The second conveying unit 20 includes a plurality of pressing wheels 22 rotatably disposed on the cantilever 21, and the plurality of pressing wheels 22 are configured to be abutted against the workpiece 2. In the height direction H, the plurality of pressing wheels 22 protrude beyond the correction member 32 at a side close to the first conveying unit 10. The plurality of pressing wheels 22 may be made of foam material and be compressible and elastic, and a distance that one of the plurality of pressing wheels 22 protruding from the correction member is between 1 mm and 5 mm (preferably between 1 mm and 3 mm). Therefore, the plurality of pressing wheels 22 are elastically abutted against the workpiece 2 in a direction toward the conveyor 11 so as to provide stable restriction.

The height adjustment mechanism 30 further includes an adjusting rod 33 connected between the cantilever 21 and the base 40, and the adjusting rod 33 is rotatable to drive the cantilever 21 to move in the height direction H. In this embodiment, the adjusting rod 33 and the correction member 32 are located at two opposite sides of the second conveying unit 20. The feeding mechanism 1 includes an inlet side 50 and an outlet side 60, the adjusting rod 33 is disposed on the outlet side 60, and the correction member 32 is disposed on the inlet side 50, as show in FIG. 1. In this way, the adjusting rod 33 and the locking member 31 respectively fix two ends of the cantilever 21 to prevent the cantilever 21 from being moved so as to have good stability. Specifically, the height adjustment mechanism 30 further includes a gauge 34 adjacent to the adjusting rod 33, and the gauge 34 is configured to show the distance between the conveyor 11 and the cantilever 21 for easy operation. The cantilever 21 includes a first slot 211 disposed therethrough, and the locking member 31 is a bolt penetrating through the first slot 211 and configured to be screwed to the base 40 so that the bolt is rotatable for locking or releasing.

Figure 3:
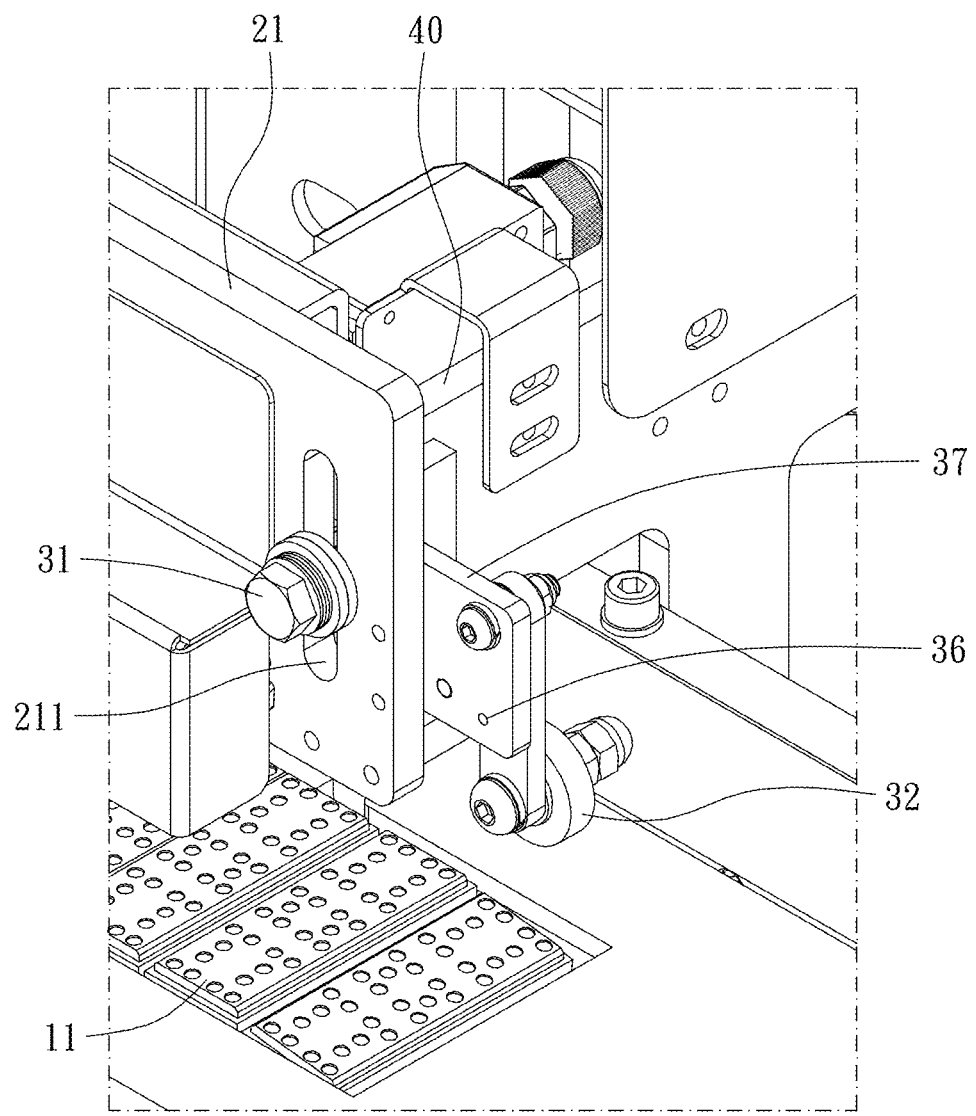
FIG. 3 is an enlargement of area B in FIG. 1.
Figure 4:
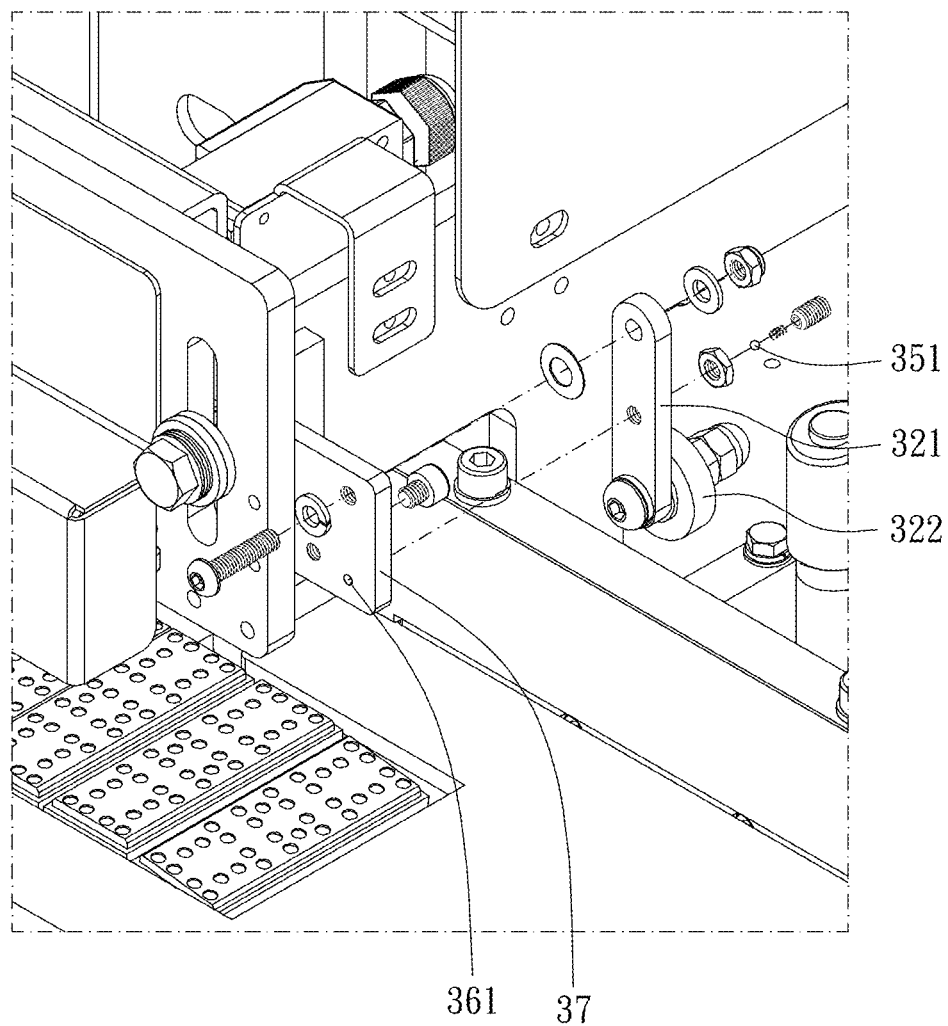
FIG. 4 is a partial breakdown drawing of FIG. 3.
Figure 5:
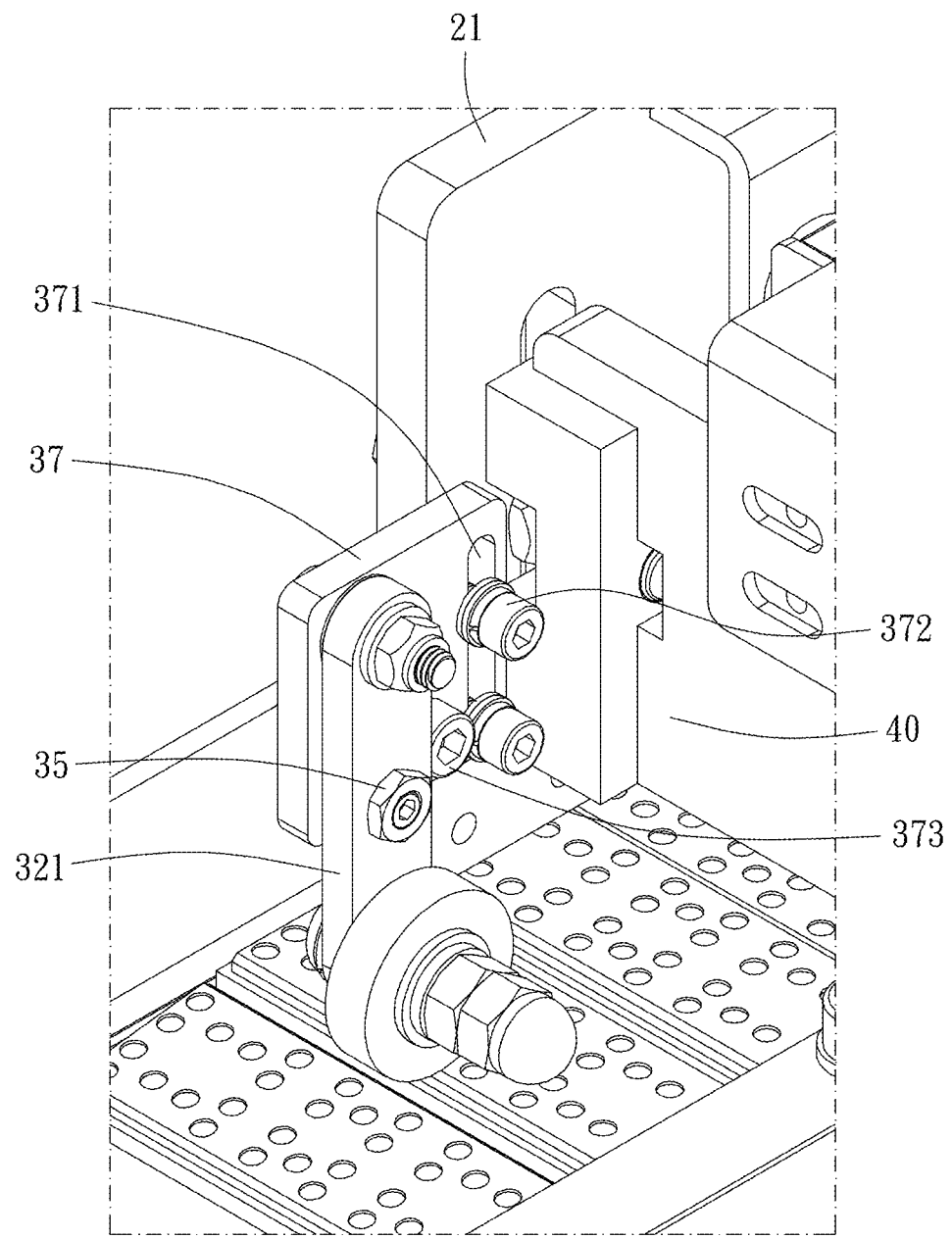
FIG. 5 is a partial enlargement of a preferable embodiment of the present invention.
Figure 7:
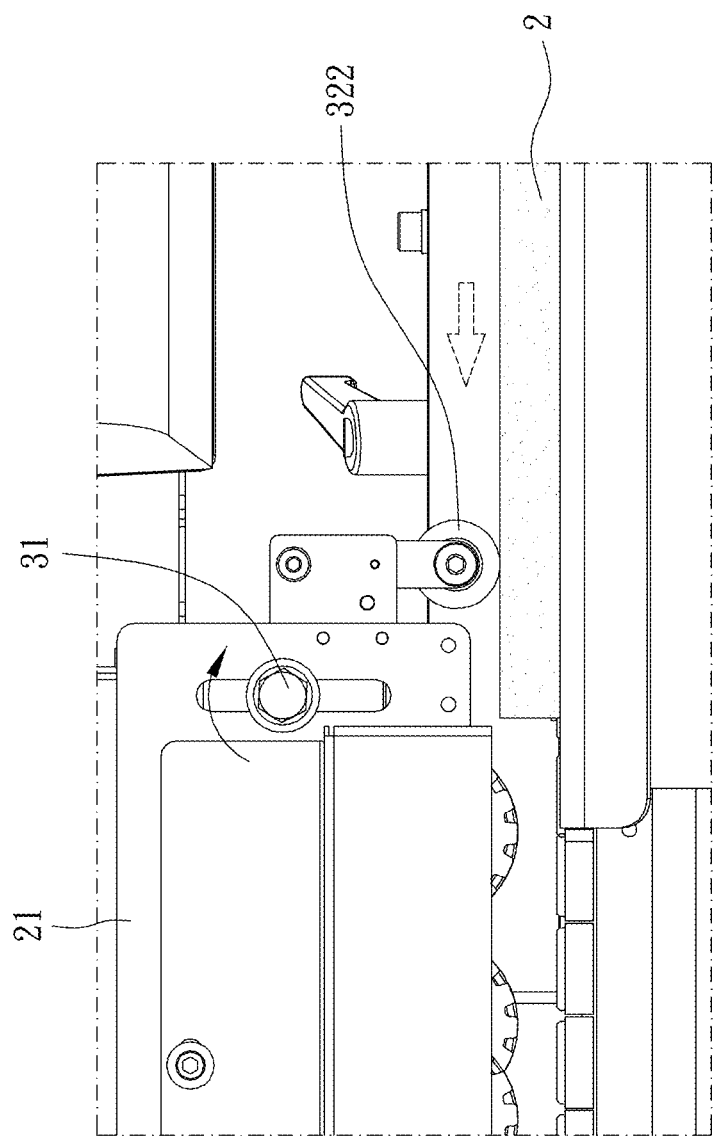
Figure 8:
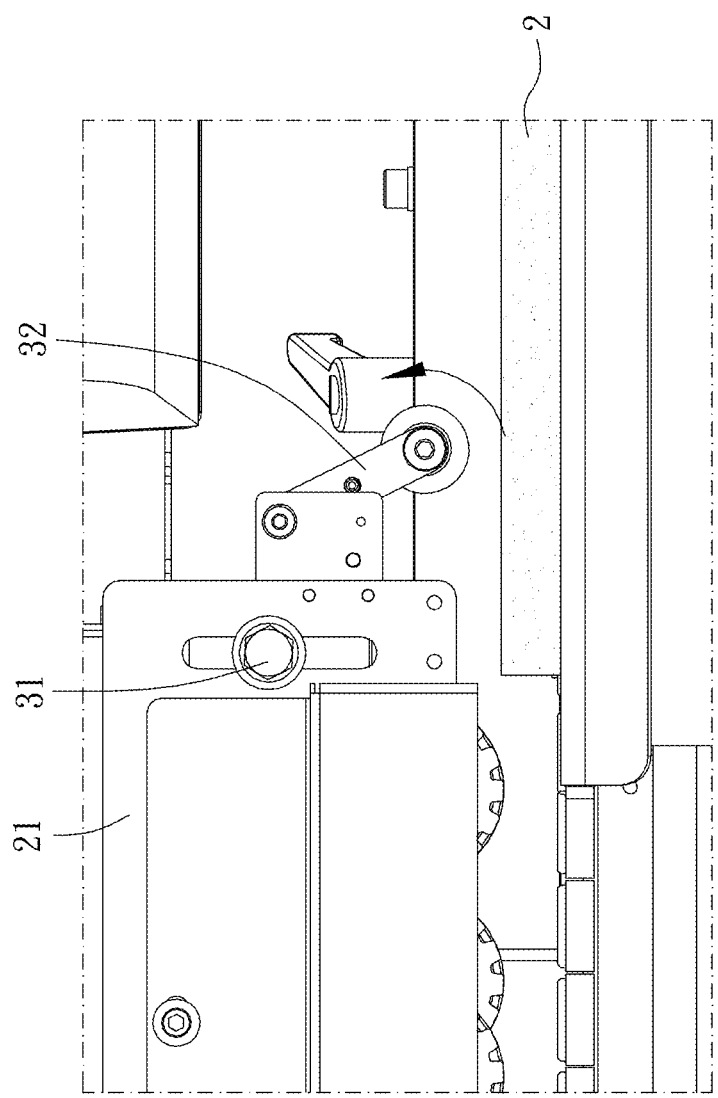

Moreover, the correction member 32 includes a swinging arm 321 and a pushing portion 322 disposed on the swinging arm 321, and the correction member 32 is swingable relative to the cantilever 21 between a first position and a second position. When the correction member 32 is in the first position, the swinging arm 321 is parallel to the height direction H, and the pushing portion 322 is configured to be abutted against the workpiece 2, as shown in FIGS. 3, 5 and 7. When the correction member 32 is in the second position, the pushing portion 322 is free of contact with the workpiece 2, as shown in FIG. 8.

In this embodiment, the pushing portion 322 is a rolling member rotatably disposed on an end of the swinging arm 321, and a surface hardness of the rolling member is larger than a surface hardness of each of the plurality of pressing wheels 22. The rolling member may be made of rubber, silicone, plastic, or the like, which provides less deformation when subjected to force for good correction effect. In this embodiment, the correction member 32 is swingable between the first position and the second position. In other embodiments, the correction member may be moved in different ways by a pneumatic cylinder, motor or other mechanisms.

Figure 2:
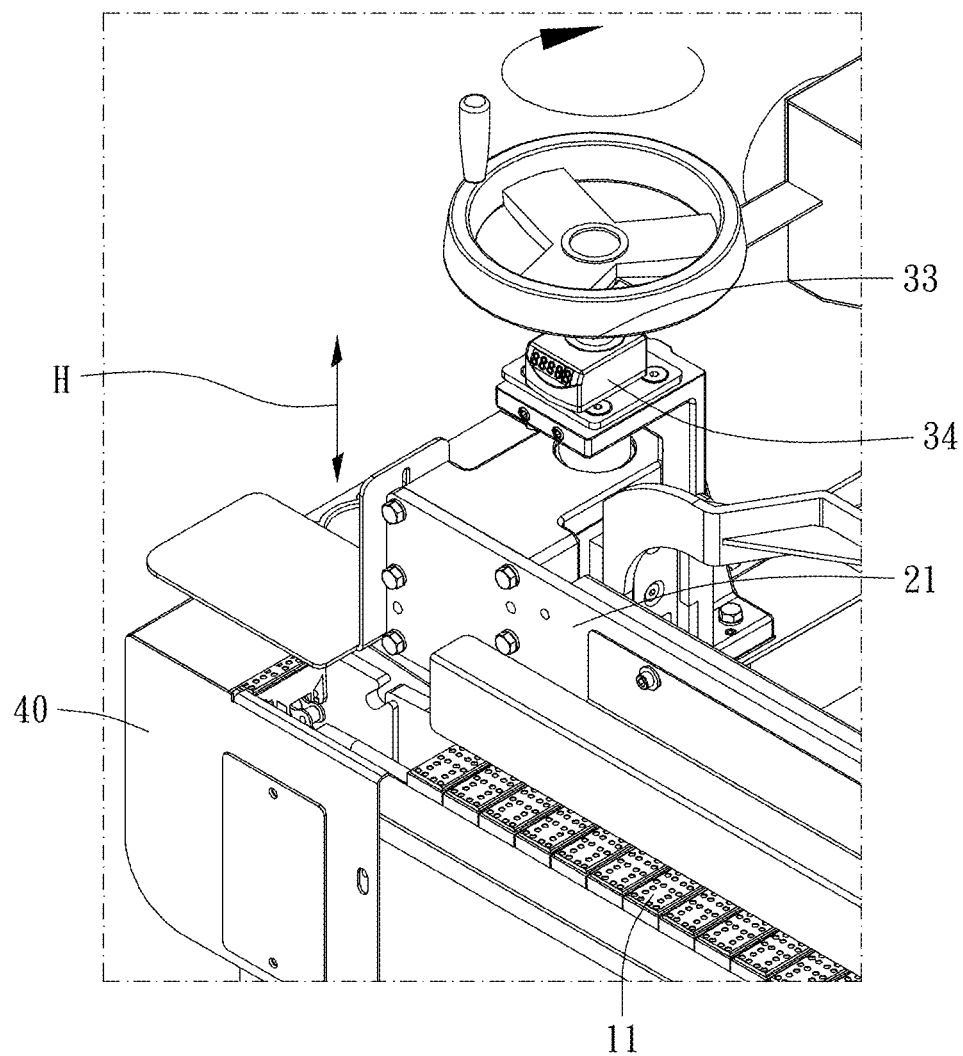
FIG. 2 is an enlargement of area A in FIG. 1.
Figure 6:
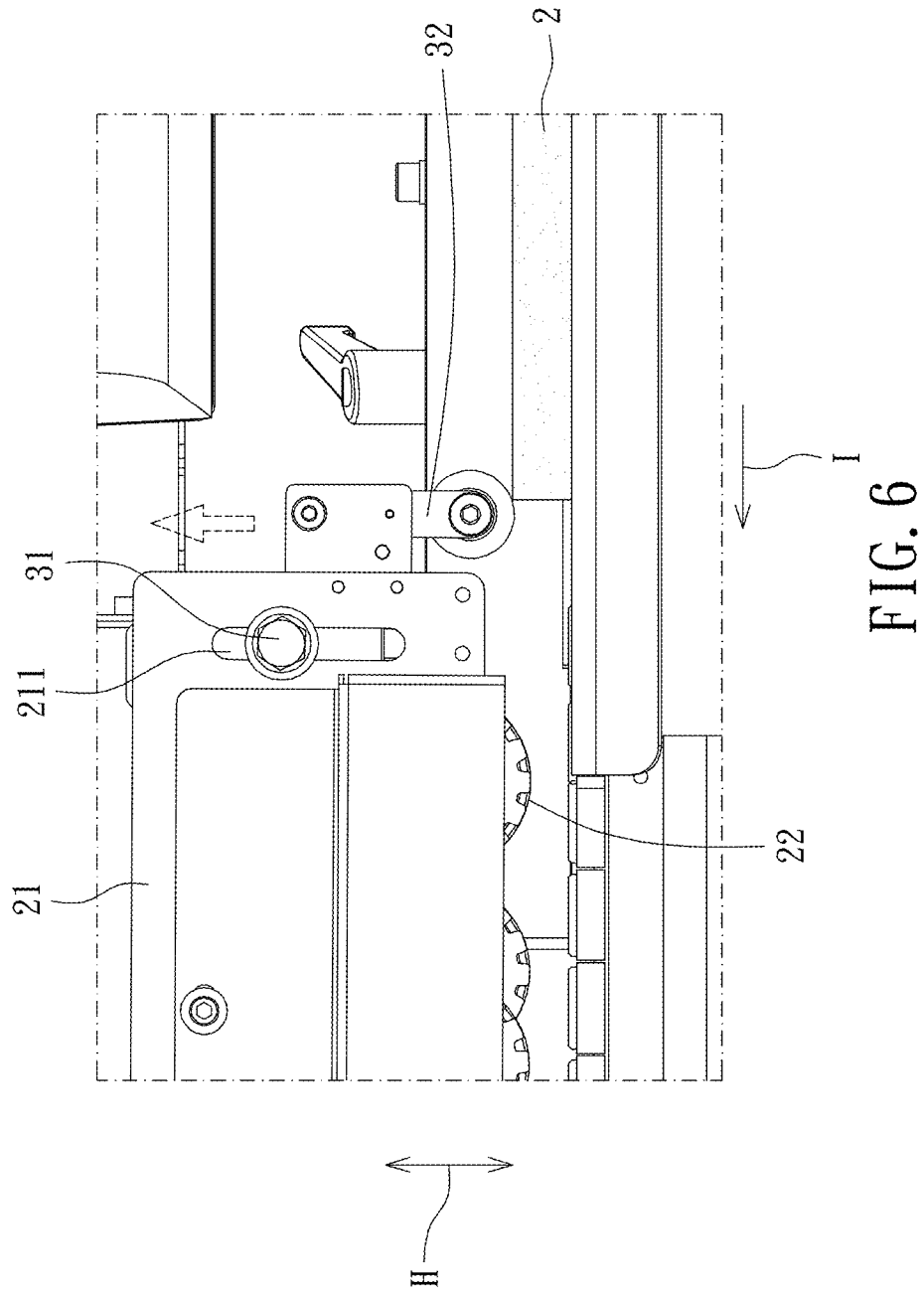
FIGS. 6-8 are drawings showing operation according to a preferable embodiment of the present invention.

To adjust a height of the cantilever 21, the locking member 31 is loosen and the adjusting rod 33 is rotated to drive the cantilever 21 to move to a predetermined height according to a thickness of the workpiece 2, as shown in FIG. 2. Then, the correction member 32 is swung to the first position and the workpiece 2 is clamped between the pushing portion 322 and the first conveying unit 10 in the height direction H, as shown in FIGS. 6 and 7. Finally, the locking member 31 is tightened to position the cantilever 21, and the correction member 32 is swung to the second position to avoid interference with the workpiece 2 during feeding, as shown in FIG. 8, which is easy to operate and provides good accuracy.

Preferably, the height adjustment mechanism 30 further includes a first positioning portion 35 and a second positioning portion 36. The first positioning portion 35 is disposed on the swinging arm 321, and the second positioning portion 36 is disposed on the cantilever 21. When the correction member 32 is in the first position, the first positioning portion 35 is interferingly engaged with the second positioning portion 36 in a swinging direction of the correction member 32 so as to avoid over-swinging.

Furthermore, the height adjustment mechanism 30 further includes a connecting member 37 connected between the cantilever 21 and the correction member 32, and the connecting member 37 is positioned on the cantilever 21 and a position of the connecting member 37 is adjustable in the height direction H. Please refer to FIG. 5, the connecting member 37 includes a second slot 371 and at least one fastener 372 disposed through the second slot 371, and the connecting member 37 is restricted between the at least one fastener 372 and the cantilever 21. Therefore, positions of the connecting member 37 and the correction member 32 in the height direction H are adjustable according to the elasticity of the plurality of pressing wheels 22, a hardness of the rolling member, or other factors so as to meet different requirements. In this embodiment, the swinging arm 321 is swingably disposed on the connecting member 37, the first positioning portion 35 includes an engaging projection 351 retractably protruding from a side of the swinging arm 321, and the second positioning portion 36 includes an engaging recess 361 disposed on a side of the connecting member 37 so that the correction member 32 can be positioned in the first position for easy operation. Preferably, the connecting member 37 further includes a blocking portion 373 protruding from the swinging arm 321, and the blocking portion 373 may be a bolt. When the correction member 32 is in the first position, the swinging arm 321 is abuttable against the blocking portion 373 so as to be stably blocked with the correction member 32 and prevent the first positioning portion 35 from being disengaged from the second positioning portion 36. In other embodiments, the blocking portion may be a projection integrally protruding from the connecting member.

The present invention further provides an edge banding machine 3, configured to attached an edge band to the workpiece 2, including the feeding mechanism 1 as described above, further including: the base 40 and an edge band conveying mechanism 70. The edge band conveying mechanism 70 is configured to convey the edge band to a side of the feeding mechanism 1. With the feeding mechanism 1, the workpiece 2 is stably positioned and transported, and the edge band can be accurately attached to the workpiece 2, and the feeding mechanism 1 is also convenient for processing operations such as gluing, grinding, and cutting.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A feeding mechanism, including:
a first conveying unit, configured to be disposed on a base along a feeding direction;
a second conveying unit, configured to clamp a workpiece with the first conveying unit to move the workpiece along the feeding direction, including a cantilever configured to be disposed on the base, the cantilever spaced apart from the first conveying unit and a position of the cantilever being adjustable relative to the first conveying unit in a height direction; and
a height adjustment mechanism, including a locking member and a correction member configured to be abutted against the workpiece, the locking member releasably connected with the base and the cantilever, the correction member connected with the cantilever and being co-movable with the cantilever in the height direction.

2. The feeding mechanism of claim 1, wherein the second conveying unit includes a plurality of pressing wheels rotatably disposed on the cantilever, the plurality of pressing wheels are configured to be abutted against the workpiece, and in the height direction, the plurality of pressing wheels protrude beyond the correction member at a side close to the first conveying unit.

3. The feeding mechanism of claim 2, wherein a distance that one of the plurality of pressing wheels protruding from the correction member is between 1 mm and 5 mm.

4. The feeding mechanism of claim 1, wherein the height adjustment mechanism further includes an adjusting rod connected between the cantilever and the base, and the adjusting rod is rotatable to drive the cantilever to move in the height direction.

5. The feeding mechanism of claim 4, wherein the adjusting rod and the correction member are located at two opposite sides of the second conveying unit.

6. The feeding mechanism of claim 1, wherein the height adjustment mechanism further includes a connecting member connected between the cantilever and the correction member, and the connecting member is positioned on the cantilever and a position of the connecting member is adjustable in the height direction.

7. The feeding mechanism of claim 1, wherein the correction member includes a swinging arm and a pushing portion disposed on the swinging arm, the correction member is swingable relative to the cantilever between a first position and a second position; when the correction member is in the first position, the swinging arm is parallel to the height direction, the pushing portion is configured to be abutted against the workpiece; and when the correction member is in the second position, the pushing portion is free of contact with the workpiece.

8. The feeding mechanism of claim 7, wherein the height adjustment mechanism further includes a first positioning portion and a second positioning portion, the first positioning portion is disposed on the swinging arm, the second positioning portion is disposed on the cantilever; and when the correction member is in the first position, the first positioning portion is interferingly engaged with the second positioning portion in a swinging direction of the correction member.

9. The feeding mechanism of claim 8, wherein the first conveying unit includes a conveyor, the second conveying unit includes a plurality of pressing wheels rotatably disposed on the cantilever, the plurality of pressing wheels are configured to be abutted against the workpiece, and in the height direction, the plurality of pressing wheels protrude beyond the correction member at a side close to the first conveying unit; a distance that one of the plurality of pressing wheels protruding from the correction member is between 1 mm and 3 mm; the cantilever includes a first slot disposed therethrough, the locking member is a bolt penetrating through the first slot and configured to be screwed to the base; the height adjustment mechanism further includes an adjusting rod connected between the cantilever and the base, and the adjusting rod is rotatable to drive the cantilever to move in the height direction; the feeding mechanism includes an inlet side and an outlet side, the adjusting rod is disposed on the outlet side, the correction member is disposed on the inlet side; the height adjustment mechanism further includes a connecting member connected between the cantilever and the correction member, and the connecting member is positioned on the cantilever and a position of the connecting member is adjustable in the height direction; the connecting member includes a second slot and at least one fastener disposed through the second slot, the connecting member is restricted between the at least one fastener and the cantilever; the swinging arm is swingably disposed on the connecting member, the pushing portion is a rolling member rotatably disposed on an end of the swinging arm, a surface hardness of the rolling member is larger than a surface hardness of each of the plurality of pressing wheels; the first positioning portion includes an engaging projection retractably protruding from a side of the swinging arm, the second positioning portion includes an engaging recess disposed on a side of the connecting member; and the connecting member further includes a blocking portion protruding from the swinging arm, when the correction member is in the first position, the swinging arm is abuttable against the blocking portion.

10. An edge banding machine, configured to attached an edge band to a workpiece, including the feeding mechanism of claim 1, further including: the base and an edge band conveying mechanism, wherein the edge band conveying mechanism is configured to convey the edge band to a side of the feeding mechanism.

* * * * *